United States Patent [19]
Boeckenhoff et al.

[11] 3,969,085
[45] July 13, 1976

[54] WIRE AND METHOD FOR MAKING STEEL WOOL

[75] Inventors: Hermann Josef Boeckenhoff, Blecher; Günter Thoms; Erich Pueschner, both of Cologne, all of Germany

[73] Assignee: Arbed-Felten & Guilleaume Drahtwerke GmbH, Cologne-Mulheim, Germany

[22] Filed: June 9, 1975

[21] Appl. No.: 584,819

[30] Foreign Application Priority Data
June 8, 1974  Germany............................ 2427780

[52] U.S. Cl................................ 29/193; 29/4.5 A; 72/274
[51] Int. Cl.² .................... E04C 5/00; B21C 37/00
[58] Field of Search.......................... 29/193; 140/2

[56] References Cited
UNITED STATES PATENTS
400,869  4/1889  Norton et al. ................. 29/193 X FOREIGN PATENTS OR APPLICATIONS
570,946  12/1961  Belgium............................. 29/193
945,196  12/1963  United Kingdom................. 29/193

Primary Examiner—Othell M. Simpson
Assistant Examiner—Leon Gilden
Attorney, Agent, or Firm—Karl F. Ross; Herbert Dubno

[57] ABSTRACT

A wire for making steel wool has, in cross-sectional profile, a straight top, a pair of sides extending down from said top, and a downwardly and outwardly concave bottom. The sides either taper regularly down from said top toward said bottom so as to impart to said wire a trapezoidal cross-section, or lower portions of otherwise parallel sides taper inwardly at an angle of approximately 20° so that the wire is much narrower at the bottom than at the top. The corners between the sides and the bottom are rounded so as to reduce waste in the production of steel wool. Such a wire is received in a capstan of a steel-wool making machine having wire-holding grooves with central outwardly convex ridges receivable within the concavity in the bottom of the wire.

9 Claims, 3 Drawing Figures

WIRE AND METHOD FOR MAKING STEEL WOOL

FIELD OF THE INVENTION

The present invention relates to the production of steel wool. More particularly this invention concerns a wire for making steel wool, a method of using the wire, and a machine for making steel wool from the wire.

BACKGROUND OF THE INVENTION

In the production of steel wool a plurality of steel wires are generally arranged in a band and passed in side-by-side respective grooves around a capstan adjacent a blade. This blade is positioned to cut shavings from the wire, these shavings being used to form the steel wool mats or pads. The wires typically have a starting diameter of up to 4 mm of which over 3 mm is reduced to shavings before the machine must be reloaded.

When round- or circular-section wire is used the first shavings are discontinuous and, therefore, unusable, and the subsequent shavings become ever thicker. Thus a certain amount of the metal is lost and a product of a very uneven quality is produced. Furthermore it is possible for the wire to twist in its own axis so that even once a substantial portion of the wire has been removed so that normally thick shavings could be made, the bad orientation will cause uneven shavings to be cut off.

In order to solve this problem it has been suggested to use square- or rectangular-section wire. The grooves in the capstan are correspondingly shaped so that an extremely sure and stable guiding of the wire is ensured. In addition relatively uniform shavings can be produced right from the start. A considerable disadvantage of this type of wire is, however, that there is considerable waste. Typically 14.2% of the wire cannot be used, compared to 9.6% in a circular-section wire.

In order to reduce this loss it has been suggested to combine the two sections by forming a wire whose upper portion is square or rectangular in section and whose lower portion, that is the portion guided in the capstan, is round. The grooves in the capstan are correspondingly formed round. Such an arrangement has, however, the disadvantage that the wires tend to twist in the capstan and, once again, shavings of nonuniform section are produced. Thus a low-quality steel wool is produced.

OBJECT OF THE INVENTION

It is therefore an object of the present invention to provide an improved wire for making steel wool.

Another object is the provision of an improved method of making steel wool.

Yet another object is the provision of an improved machine for making steel wool.

A further object is to provide a steel-wool wire which can be used to make a high-quality steel wool, that is a wire from which uniform shavings can be regularly cut, and which will entail a low percentage of waste.

SUMMARY OF THE INVENTION

These objects are attained according to the present invention in a wire for making steel wool which is solid and has a cross-sectional profile with a straight top, a pair of sides extending down from said top, and a downwardly and outwardly concave bottom. This wire is narrower at the bottom than at the top, which is effected either by tapering the entire side walls toward the bottom, or a portion of these side walls adjacent the bottom. This wire according to the present invention is fitted in an outwardly open groove in a capstan of a steel-wool machine, which groove has a bottom or root which is outwardly convex at its center so as to fit within the longitudinally extending concavity on the bottom of the wire. This wire is shaved down from its top surface.

In accordance with the present invention the wire has a width at its top which is approximately equal to its height perpendicular to this top, and advantageously lies between 3 mm and 5 mm. The width of the wire across its bottom is equal to between 80% and 90% of the width of the top. The depth of the concavity in the bottom of the wire is between 0.2 mm and 0.4 mm.

According to another feature of this invention the corners of the wire between the sides and bottom are rounded.

According to yet another feature of this invention each of the side surfaces, instead of being generally straight from the top to the bottom, is formed of a pair of straight portions. The upper two thirds are parallel or only slightly tapered toward the bottom or even parallel, and the bottom third lies at an angle of between to 10° and 30°a perpendicular drawn from the top. Thus it is possible for the bottom of the wire to have a width equal to approximately 55% of that of the top. In this manner the waste in production of steel wool can be reduced greatly.

With the wire according to the present invention a wide and flat starting surface is presented to the shaving blade so that right from the beginning of the production operation a usable and uniform-section shaving is produced. It is also possible to form the grooves on the capstan very close to each other for the wires according to the present invention so that a very high output can be obtained from a single shaving machine. Since the profiled bottom is snugly received in the groove in the capstan, the shaving blade always will meet the upper surface flatly and will always produce a very high-quality shaving.

Also in accordance with the present invention it is possible to adapt a conventional shaving machine having a capstan formed with semicircular section grooves for the wire in accordance with this invention. The capstan need merely be machined down in a very simple operation that allows the overall output of the machine to be increased considerably. In addition after this conversion operation it is still possible to use a round-section wire, as the groove shaped according to the present invention will equally well receive a round-section wire.

Indeed with the present invenion it has been found that the amount of wire that cannot be shaved off is equal to approximately 9.7%, slightly more than with a round-section wire. But with the wire and system according to the present invention a consistently high-quality product is obtained right from the start so that in effect waste is reduced by approximately 60%. It is possible to obtain an 11% increase in production over a typical square-section wire.

BRIEF DESCRIPTION OF THE DRAWING

The above nd other objects, features, and advantages will become more readily apparent, reference being made to the accompanying drawing in which.

SPECIFIC DESCRIPTION

Figure 1:
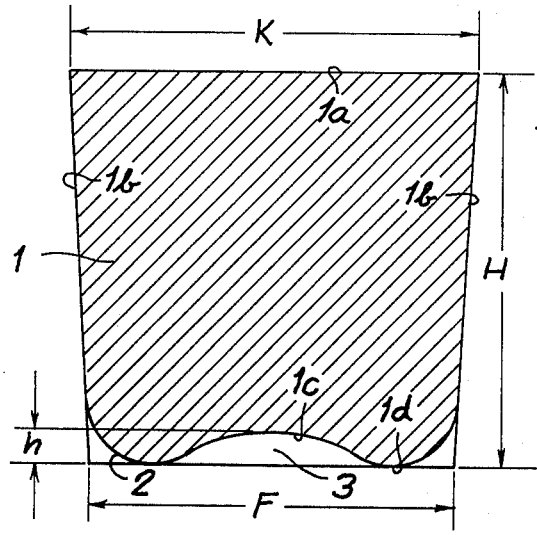
FIGS. 1 and 2 are the cross-sections of two wires according to the present invention.

A wire 1 as shown in FIG. 1 is of generally trapezoidal shape and has a top 1a which is a straight and a pair of straight sides 1b extending down from the top and tapering downwardly toward each other. The bottom 1c of the wire 1 is formed with a longitudinally extending concavity 3 and the corners between the sides 1b and the bottom 1c are rounded off as is shown at 2 so as to form a pair of longitudinally extending humps 1d on the bottom of the wire 1.

This wire 1 has a width K at its top and an overall height H perpendicular to its top 1a which are both equal to 3.5 mm. The width F of the bottom of foot of the wire is equal to 3.0 mm, that is 85% of the width K. The concavity 3 has a height $h$ equal to 0.3 mm. The corners 2 are turned on a radius of curvature equal to a distance of 0.3 mm.

With the wire as shown in FIG. 1 a 14% greater yield is obtained than with round wire having a diameter of 3.5 mm. At the same time the waste is only slightly greater than that of the round wire, that is 9.7% compared to 9.6%. In addition compared to a square of rectangular-section wire the waste is reduced by 60%. Thus it is possible with the system according to the present invention to produce 11% more shavings suitable for making steel wool than has hitherto been possible with any type of wire.

Figure 2:
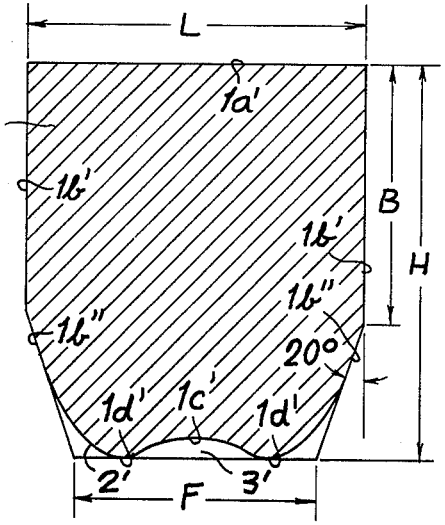

The wire 1' shown in FIG. 2 in cross secton profile has a flat top 1a', a pair of upper side portions 1b' extending parallel downwardly from the top 1a', a pair of lower side portions 1b'' extending downwardly and inwardly from the upper portions 1b', and a lower surface 1c' formed with a concavity 3' defining a pair of humps 1d'. The corners 2' between the lower side portions 1b'' and the bottom 1c'' are rounded off. In addition the lower side portions 1b'' *lie at an angle of between* 10° and 30°, here 20°, to the parallel upper portions 1b'. The top 1a' of the wire 1' has a width L equal to 2.9 mm. The upper side portion 1b' is equal to two thirds of the overall height H of the wire 1'. The foot width, measured at the imaginary meeting point of a continuation of the lower side portions 1b' in a straight line across the bottom humps 1d' is equal to slightly over 2 mm.

Figure 3:
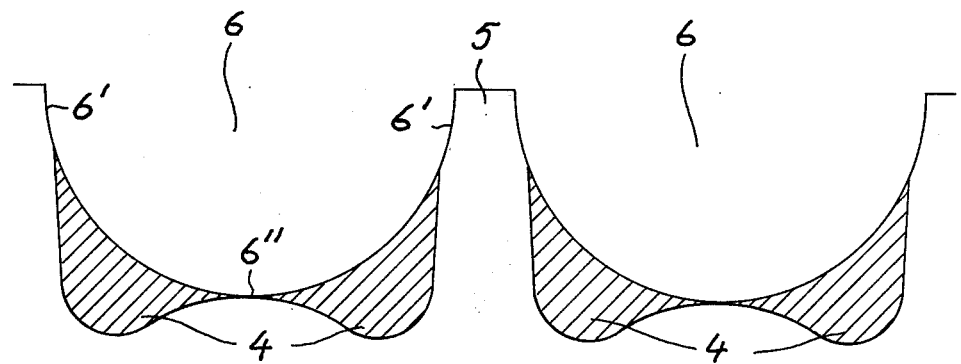
FIG. 3 is a diagram illustrating the formation of a capstan according to this invention.

With the system according to the present invention it is possible as shown in FIG. 3 to take a conventional capstan 5 formed with a plurality of side-by-side semicircular-section grooves 6 and cut out these grooves as indicated at hatching 4 to receive the wires as described above. Even after such remachining of the capstan of the steel-wool making machine it is possible to use the grooves 6 for round-section wires, which will then seat against the sides 6' and the top of the longitudinally extending bump or ridge 6'' in the bottom of the groove 6.

We claim:

1. A wire for making steel wool, said wire being solid and having a cross-sectional profile with a straight top, a pair of sides extending down from said top, and a downwardly and outwardly concave bottom, said wire being narrower at said bottom than at said top.

2. The wire defined in claim 1 wherein said top has a width equal to between 3 mm and 5 mm, said wire having a height between said top and said bottom also between 3 mm and 5 mm, said bottom having a concavity with a depth equal to between 0.2 mm and 0.4 mm.

3. The wire defined in claim 2 wherein said bottom has a width equal to between 80% and 90% of the width of said top measured in the same direction.

4. The wire defined in claim 2 wherein said sides and said bottom meet at outside corners, said corners being rounded.

5. The wire defined in claim 1 wherein said sides are substantially straight and taper uniformly from said top to said bottom.

6. The wire defined in claim 1 wherein said sides each have an upper portion extending downwardly from said top and parallel to the corresponding upper portion of the other side, and a lower portion extending from said upper portion to said bottom and extending at an angle to the respective upper portion.

7. The wire defined in claim 6 wherein said lower portions extend at an angle of between 10° and 30° to said upper portions.

8. The wire defined in claim 7 wherein said upper portions have a length perpendicular to the width of said top equal to between one half and three quarters the height of said wire perpendicular to said top between said top and said bottom.

9. The wire defined in claim 1 wherein said bottom has a width equal to between 50% and 60% of the width of said top measured in the same direction.

* * * * *